Figure 1:
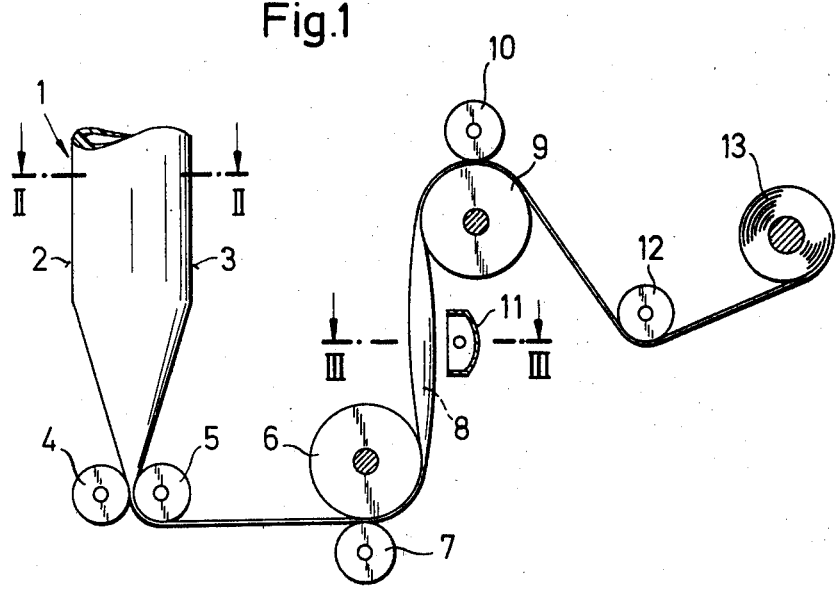

United States Patent [19]

Gneuss et al.

[11] 3,950,469

[45] Apr. 13, 1976

[54] PROCESS FOR THE PRODUCTION OF A PLASTIC TUBE TO BE USED AS AN ARTIFICIAL SAUSAGE CASING

[75] Inventors: Detlef Gneuss, Marktredwitz; Hans Strutzel; Wolfgang Meintzschel, both of Wiesbaden, all of Germany

[73] Assignee: Hoechst Aktiengesellschaft, Germany

[22] Filed: May 31, 1974

[21] Appl. No.: 475,022

Related U.S. Application Data

[63] Continuation-in-part of Ser. No. 316,984, Dec. 20, 1972, abandoned.

[30] Foreign Application Priority Data

Dec. 22, 1971 Germany............................ 2163764

[52] U.S. Cl................ 264/95; 264/177 R; 264/209; 264/210 R; 264/288; 264/290 R
[51] Int. Cl.² ...................... B29D 7/24; B29C 17/02
[58] Field of Search............ 264/209, 177 R, 95, 89, 264/290 R, 288, 289, 210 R

[56] References Cited
UNITED STATES PATENTS

| | | | |
|---|---|---|---|
| 1,654,253 | 12/1927 | Henderson...................... | 264/177 R |
| 2,136,566 | 11/1938 | Schnecko et al. ..................... | 264/95 |
| 2,925,621 | 2/1960 | Parth ..................................... | 264/95 |
| 3,229,006 | 1/1966 | Nohl .................................. | 264/209 |
| 3,242,531 | 3/1966 | Nohl .................................. | 264/209 |

FOREIGN PATENTS OR APPLICATIONS

| | | |
|---|---|---|
| 811,066 | 9/1958 | United Kingdom................. 264/209 |
| 962,435 | 7/1964 | United Kingdom.................. 264/95 |

*Primary Examiner*—Jeffery R. Thurlow
*Attorney, Agent, or Firm*—James E. Bryan

[57] ABSTRACT

This invention relates to a process for the manufacture of a plastic tube suitable for use as a sausage casing, which comprises extruding a crystalline thermoplastic material at a temperature above its crystalline melting point through an annular die of non-uniform cross-section, to produce a tube any cross-section of which varies continuously from a maximum to a minimum, the positions of the minimum and maximum thickness being diametrically opposed, the maximum being 1.3 to 3.0 times as thick as the minimum, cooling the tube to below its crystalline melting point, biaxially orienting the tube, and longitudinally stretching the biaxially oriented tube under conditions such that the temperature of the portion of the tube of maximum thickness is greater than that of the portion of the tube of minimum thickness. The invention also relates to the tube so produced.

5 Claims, 3 Drawing Figures

PROCESS FOR THE PRODUCTION OF A PLASTIC TUBE TO BE USED AS AN ARTIFICIAL SAUSAGE CASING

This is a Continuation-in-Part of application Ser. No. 316,984, filed Dec. 20, 1972, now abandoned, by the present inventors.

This invention relates to a process for the manufacture of a plastic tube, suitable for use as an artificial sausage casing.

It is known to use tubes made of thermoplastic materials for artificial sausage casings. It is also known to produce the tubes from plastics which can be stretched under heat, the tubes being biaxially oriented to strengthen them. It is also known to longitudinally stretch these already biaxially oriented tubular films, in cases where it is desired to obtain, after slitting longitudinally, a sheet of film of particularly high tensile strength.

It has been proposed to produce sausage casings in a curved, so-called "ring" shape. Ring-shaped skins made of regenerated cellulose are used in great quantities, and artificial sausage casings consisting of thermoplastic material are also used.

It has been proposed to produce artificial sausage casings from thermoplastic material which are initially straight but are changed into a ring shape when heated. This type of ring-shaped skin is preferred since their original straight shape facilitates packing and processing, it being advantageous that they can be wound up in the form of a flattened tube. In the known process for producing tubes which can be changed into a ring shape, only one half of a biaxially stretched plastic tube is heated, while it is inflated with air and its length is kept constant by force, until this half of the tube is annealed and loses the heat-shrinkability acquired as a result of the biaxial stretching. If a sausage having a casing consisting of such a tube is heated, the straight sausage is changed into a ring-shaped sausage. This process has the disadvantage, however, that the tubes obtained have progressively less strength the narrower the mean diameter of the ring obtainable, so that in practice it is not possible to acquire sufficiently strong sausage casings having a mean ring diameter of 25 cm or even, as is very often required, of 20 cm or less.

The present invention provides a process for the manufacture of a plastic tube suitable for use as a sausage casing, which comprises extruding a crystalline thermoplastic material, such as polypropylene, preferably polyethylene terephthalate, at a temperature above its crystalline melting point through an annular die of non-uniform cross-section, to produce a tube any cross-section of which varies continuously from a maximum to a minimum, the positions of the minimum and maximum thicknesses being diametrically opposed, the maximum being 1.3 to 3.0 times as thick as the minimum, cooling the tube to below its crystalline melting point, biaxially orienting the tube, and longitudinally stretching the biaxially oriented tube under conditions such that the temperature of the portion of the tube of maximum thickness is greater than that of the portion of the tube of minimum thickness.

The present process produces a tube of which the thin-walled portion is substantially easier to stretch in the transverse direction than in the longitudinal direction by means of a pressure for expanding the tube, so the width is extended at the cost of a decrease in length. The latter causes the tube to form a curve.

A process in which a tube, which is biaxially stretched and subsequently longitudinally stretched, is formed from polyethylene terephthalate is described in British Patent No. 811,066; in the process described therein, however, the subsequently stretched tube is longitudinally slit to produce a flat film. In the process according to the invention, it is more advantageous to produce the biaxially stretched film by using the process described in British Patent No. 1,089,863 (corresponding to German Offenlegungsschrift 1,504,461).

The process according to the invention differs from the process for the production of a biaxially stretched plastic tube described in British Patent No. 1,089,863, however, in that on extrusion of the molten plastic material from the ring nozzle a tube of non-uniform wall-thickness is produced. Moreover, the biaxially stretched tube is subsequently stretched. The process according to the invention differs from the process for forming a biaxially stretched and subsequently stretched plastic tube described in British Patent No. 811,066 not only by the fact that its end product is a subsequently stretched tube instead of a subsequently stretched flat film and that the tube is of non-uniform wall-thickness, but also in that the tube is of non-uniform temperature during the subsequent stretching process.

The tube produced according to the invention is provided with non-uniform wall thickness by using a correspondingly non-uniform ring die. This is most advantageously achieved by positioning the core eccentrically to the nozzle casing.

After extruding, the extruded tube has, for example, a maximum wall thickness of 0.27 to 0.5 mm and a minimum wall thickness of 0.1 to 0.2 mm. It has proved advantageous to keep the ratio of minimum wall thickness to maximum wall thickness in the range of 1 : 1.5 to 1 : 2.3. After extruding the tube, its diameter may, for example, be 12 to 15 mm. As a result of the biaxial stretching, a tube of relatively large diameter and relatively small wall thickness is obtained, for example from 55 to 65 mm in diameter, and 0.031 to 0.044 mm maximum wall thickness and 0.010 to 0.014 mm minimum wall thickness. The extruded tube is biaxially oriented by longitudinal stretching in the range of from about 1 : 3.3 to 1 : 3.8 and transverse stretching in the range of from about 1 : 4 to 1 : 4.6. By means of the subsequent longitudinal stretching there is drawn therefrom a tube of substantially smaller diameter, for example 26 mm, with wall thicknesses which may be somewhat larger than those of the biaxially stretched tube, for example 0.045 to 0.052 and 0.013 to 0.015 mm. Generally, the maximum wall thickness is approximately 1.7 to 4 times as large as the minimum thickness.

The biaxially stretched tube can acquire the non-uniform temperature prior to its subsequent stretching process by initially heating it to a temperature which is higher than the temperature at which the longitudinal stretching is to be carried out, and then allowing the tube to cool down to the stretching temperature, wherein, although there is a generally uniform rate of heat loss, that portion of the tube having thicker walls cools more slowly owing to its higher heat content, and consequently at the end of the cooling period has a higher temperature than the portion having the thinner walls. The non-uniform temperature distribution required for the subsequent stretching process can alternatively or also be produced by radiating heat onto one side only, i.e. the thick-walled side of the tube, so that the latter is heated to a greater temperature than the other side of the tube. According to previous experience, it seems to be most practical to preheat the biaxially stretched tube by means of contact with one or more heated rollers, and then to radiate heat onto the thicker-walled portion of the tube.

The temperatures used in the subsequent stretching process are determined by the plastic material used. They should be below the crystalline melting point but above the glass transition point of the particular plastic material. The plastic material preferred for this use in the process of the invention is polyethylene terephthalate, because the plastic skins produced therefrom are preferred for retaining their strength and shape at temperatures in the region of 100°C. In the case of biaxially stretched tubes made of polyethylene terephthalate, the subsequent stretching process is best carried out in the temperature range of 80° to 150°C, i.e. the temperature of the thin wall portion should be at least 80°C, and the temperature of the thick wall portion should be 150°C at the highest. More specifically, such subsequent stretching or post-stretching is carried out in a manner such that the portion of the tube of maximum diameter is at a temperature from about 120° to 150°C and the portion of the tube of minimum diameter is at a temperature from about 80° to 130°C. The thicker side of the biaxially stretched tube should be warmer while post stretching in order to reduce the stretching force on that side with respect to the thinner side during the post stretching operation, since the stretching force is a function of the temperature.

During the subsequent stretching process, there is some air in the tube for the purpose of keeping the opposite sides of the tube separated from one another. Contrary to the biaxial stretching which, as is known, is likewise carried out with air in the tube, the air in the subsequent stretching process is not for expanding or stretching the tube, but it is adequate merely to have inside the tube a fraction of the air which would be necessary to fill it completely. The air serves mainly as a heat insulator between the thinner-walled and the thicker-walled portions of the tube.

The subsequent stretching process is preferably carried out to give a decrease in the diameter of the tube such that the ratio between the diameter of the biaxially stretched tube and the diameter of the subsequently stretched tube is in the range of 2 : 1 to 2.5 : 1. Stated differently, after post-stretching the tube acquires a diameter from about 1.5 to 2.5 times that of the tube as originally extruded by post-stretching in a range from about 1 to 1.6 to 1 to 2.2. The post-stretching ratio can be determined by the following formula:

$$\lambda_{NL} = \frac{d_1 \times D_1}{d_2 \times D_2}$$

where, $\lambda_{NL}$ is the stretching ratio,
$d_1$ is the film thickness, in microns, prior to stretching,
$d_2$ is the film thickness, in microns, after stretching,
$D_1$ is the diameter of the tube, in mm, prior to stretching, and
$D_2$ is the diameter, in mm, after stretching.

Figure 2:
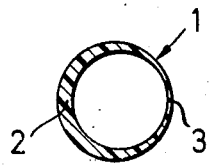
Figure 3:
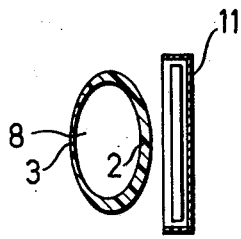

The process is further described by way of example only, with reference to the accompanying drawings, in which FIG. 1 is a schematic representation of the subsequent stretching of a biaxially stretched tube, FIG. 2 shows a cross-section along the line A—A in FIG. 1, and FIG. 3 is a cross-section along the line B—B in FIG. 1.

In FIGS. 2 and 3, the wall thicknesses are exaggerated.

The process illustrated is similar to the production of a biaxially stretched plastic tube according to the process described in the British Patent No. 1,089,863 already mentioned above. However, in the present case, extrusion is effected through a ring die having an eccentrically arranged core, so that a biaxially stretched tube 1 made of polyethylene terephthalate has in FIGS. 1 and 2 a half with the thinner tube-wall 3 on the right hand side and a half with the thicker tube-wall 2 on the left hand side. The tube 1, biaxially stretched in this manner, is folded flat by means of a pair of rollers 4, 5, wherein the thicker-walled left half 2 of the tube comes to rest on the thinner-walled right half 3 of the tube, the total thickness of the flattened tube being substantially uniform. The flattened tube is then conveyed over a heated roller 6, where it is nipped with the assistance of a feed roller 7. Subsequently, it is filled slightly by a small air pocket 8, and is then conveyed over a cooled roller 9, where it is again nipped by means of a second feed roller 10. While the tube contains the air pocket 8, the thick-walled portion of the tube is radiated with heat from a heat radiator 11. The cooled roller 9 is driven at a higher peripheral velocity than the heated roller 6, resulting in the subsequent stretching of the tube in its longitudinal direction. The subsequently stretched tube is then directed by a guide roller 12 to a take-up roller 13 where it is wound up. The provision of a device for the introduction of air for the formation of the air pocket is unnecessary, since it is only necessary to insert the required quantity of air initially, for example, by means of a slit cut in the tube.

The following Table 1 indicates the diameters and wall thicknesses of a number of tubes produced according to the process, and the following Table 2 indicates the wall thicknesses and mean ring diameters of the sausage casings produced from the subsequently stretched tubes after being filled and cooked.

TABLE 1

Measurements prior to and including the subsequent stretching process

| Sample No. | Core diameter in mm | after extrusion | | biaxially stretched | | subsequently stretched | | biaxially stretched | subsequently stretched |
|---|---|---|---|---|---|---|---|---|---|
| | | max. | min. | max. $d_1$ | min. $d_1$ | max. $d_2$ | min. $d_2$ | $D_1$ | $D_2$ |
| 1 | 15 | 340 | 110 | 44 | 11 | 52 | 14 | 65 | 26 |
| 2 | 15 | 340 | 110 | 43 | 11 | 51 | 14 | 65 | 26 |
| 3 | 15 | 340 | 110 | 44 | 10 | 52 | 13 | 65 | 26 |

TABLE 1-continued

| Sample No. | Core diameter in mm | Measurements prior to and including the subsequent stretching process | | | | | | Diameter in mm | |
|---|---|---|---|---|---|---|---|---|---|
| | | Wall thickness in microns | | | | | | biaxially stretched | subsequently stretched |
| | | after extrusion | | biaxially stretched | | subsequently stretched | | | |
| | | max. | min. | max. $d_1$ | min. $d_1$ | max. $d_2$ | min. $d_2$ | $D_1$ | $D_2$ |
| 4 | 15 | 270 | 130 | 38 | 12 | 45 | 15 | 65 | 26 |
| 5 | 15 | 270 | 130 | 40 | 12 | 47 | 15 | 65 | 26 |
| 6 | 15 | 270 | 130 | 39 | 13 | 47 | 15 | 65 | 26 |
| 7 | 12 | 300 | 130 | 38 | 11 | 46 | 15 | 55 | 26 |
| 8 | 12 | 300 | 130 | 31 | 10 | 47 | 14 | 55 | 26 |
| 9 | 12 | 300 | 130 | 39 | 10 | 47 | 14 | 55 | 26 |

TABLE 2

| Sample No. | Measurements on rings. | | | | |
|---|---|---|---|---|---|
| | Filled Casing | | | Filled and Boiled | |
| | Wall Thickness in microns | | Ring diameter in mm | Wall thickness in microns | | Ring diameter in mm |
| | max. | min. | | max. | min. | |
| 1 | 52 | 9 | 210 | 55 | 10 | 175 |
| 2 | 51 | 10 | 200 | 53 | 9 | 175 |
| 3 | 52 | 9 | 190 | 54 | 10 | 160 |
| 4 | 45 | 10 | 225 | 47 | 10 | 210 |
| 5 | 47 | 10 | 220 | 48 | 10 | 200 |
| 6 | 47 | 10 | 230 | 50 | 10 | 210 |
| 7 | 46 | 11 | 240 | 48 | 11 | 190 |
| 8 | 47 | 10 | 230 | 51 | 10 | 195 |
| 9 | 47 | 11 | 250 | 49 | 10 | 220 |

The data given in Tables 1 and 2 are by way of example only and do not indicate the boundaries of products produced according to the invention.

The sausage casings prepared from the plastic tubes produced according to the invention are converted to the curved ring shape on filling with sausage meat by the action of the pressure of filling only. This is a result of the fact that the sausage casings undergo an increase of their periphery under the pressure of filling, which increase occurs mainly in the thin-walled half of the tube. Such increase in periphery is possible because of the present novel production process which results in the tube having zones of higher and zones of lower elasticity at the same temperature. When the tube is used as intended for the manufacture of sausage casings, the tube is expanded by the pressure of the sausage meat being forced into the casing and the above-mentioned different elasticities of the tube result in the curvature of the sausage. Thus, this causes the formation of a curved tube and a simultaneous increase in the diameter of the tube. The plastic tubes are the first tubes to be converted into the ring shape merely by applying an inner pressure, for example the pressure of filling. In comparison with the known tubes which change into the ring form after being heated they additionally have the advantage that they can change into a ring of smaller mean diameter.

The following example further illustrates the invention

A biaxially stretched tubular film of polyethylene terephthalate is produced by means of the device described in British Patent No. 1,089,863 modified as herein described with reference to the drawings. The tube is extruded from a ring die having an eccentric core, and is drawn off over a mandrel for internal calibration of the tube and having a diameter of 14.5 mm. In the thinnest part, the wall thickness of the tube is 0.014 mm and in the thickest part 0.027 mm. By biaxial stretching the diameter of the tube is increased to 65 mm. The stretching ratio is 3.5 in the longitudinal direction and 4.5 in the transverse direction. The subsequent stretching is carried out with the device shown in FIG. 1, the temperature of the roller 6 being about 80°C. Its rotational speed gives a somewhat (3%) higher peripheral velocity than that of the rollers 4 and 5. The roller 9 is maintained by cooling at 10°C; its peripheral velocity is 1.5 times that of the heated roller 6. When running on the heated roller 6, the tube has a flattened width of 100 mm and, when on the cooled roller 9, a flat width of 40 mm. The finished tube has a diameter of 26 mm when filled with, but not distended by, air, and a wall thickness of 0.015 to 0.034 mm. With a filling pressure of 0.7 kp/cm², the tube diameter increases to 40 mm, and the filled sausage bends into a ring shape having a mean diameter of 180 mm.

It will be obvious to those skilled in the art that many modifications may be made within the scope of the present invention without departing from the spirit thereof, and the invention includes all such modifications.

What is claimed is:

1. A process for the manufacture of a plastic tube suitable for use as a sausage casing which comprises extruding polyethylene terephthalate at a temperature above its crystalline melting point through an annular die of non-uniform cross-section to produce a tube having a non-uniform wall thickness around the circumference thereof, said wall thickness varying continuously from a maximum to a minimum, the portion of minimum wall thickness and the portion of maximum wall thickness being diametrically opposed on the circumference of said tube and the maximum being from about 1.3 to 3.0 times as thick as the minimum, cooling the tube below its crystalline melting point, biaxially stretching the tube in the longitudinal direction in the range from about 1 : 3.3 to 1 : 3.8 and in the transverse direction in the range from about 1 : 4 to 1 : 4.6, and thereafter longitudinally stretching the biaxially oriented tube under conditions such that the temperature of the tube portion of maximum wall thickness is in the range from about 120° to 150° C and the temperature of the tube portion of minimum wall thickness is in the range from about 80° to 130° C, while maintaining the thickness profile of the biaxially stretched tube.

2. A process as claimed in claim 1 wherein the tube is extruded with a maximum wall thickness 1.3 to 2.3 times the minimum wall thickness.

3. A process as claimed in claim 1 wherein the post-stretching is carried out at temperatures greater than 80°C but less than 150°C.

4. A process as claimed in claim 1 wherein the tube, after post-stretching in the range from about 1 : 1.6 to 1 : 2.2, has a diameter about 1.5 to 2.5 times that of the tube as originally extruded.

5. A process as claimed in claim 1 wherein the tube after post-stretching has a maximum wall thickness 1.7 to 4 times the minimum.

* * * * *